United States Patent [19]

Hasquenoph et al.

[11] 4,416,437
[45] Nov. 22, 1983

[54] SAFETY LOCK FOR A CARRYING AND JETTISONING DEVICE FOR LOADS TRANSPORTED UNDER AIRCRAFT

[75] Inventors: Jean H. Hasquenoph, Lagny; Pierre F. Coutin, Paris, both of France

[73] Assignee: R. Alkan & Cie, France

[21] Appl. No.: 364,588

[22] Filed: Apr. 2, 1982

[30] Foreign Application Priority Data

Apr. 3, 1981 [FR] France ................... 81 06750

[51] Int. Cl.³ .................................. B64D 1/02
[52] U.S. Cl. ........................... 244/137 R; 89/1.5 F; 294/83 R
[58] Field of Search ............... 244/137 A; 89/1.5 F, 89/1.5 G, 1.5 H; 294/83 R

[56] References Cited

U.S. PATENT DOCUMENTS

| 3,722,944 | 3/1973 | Dand | 244/137 A |
| 4,182,502 | 1/1980 | Hasquenoph et al. | 244/137 A |
| 4,202,576 | 5/1980 | Hasquenoph et al. | 244/137 A |
| 4,318,561 | 3/1982 | Hasquenoph et al. | 244/137 A |

FOREIGN PATENT DOCUMENTS 2740318  3/1978  Fed. Rep. of Germany ... 244/137 A

Primary Examiner—Trygve M. Blix
Assistant Examiner—Rodney A. Corl
Attorney, Agent, or Firm—William A. Drucker

[57] ABSTRACT

The safety lock comprises a control member which prevents an untimely actuation of the jettisoning device by inserting a locking member on the path of a movable release member of this device. Simultaneously the safety lock releases braking members in order to allow nuts to rotate for ensuring the raising of the hooks to which the load is suspended.

3 Claims, 5 Drawing Figures

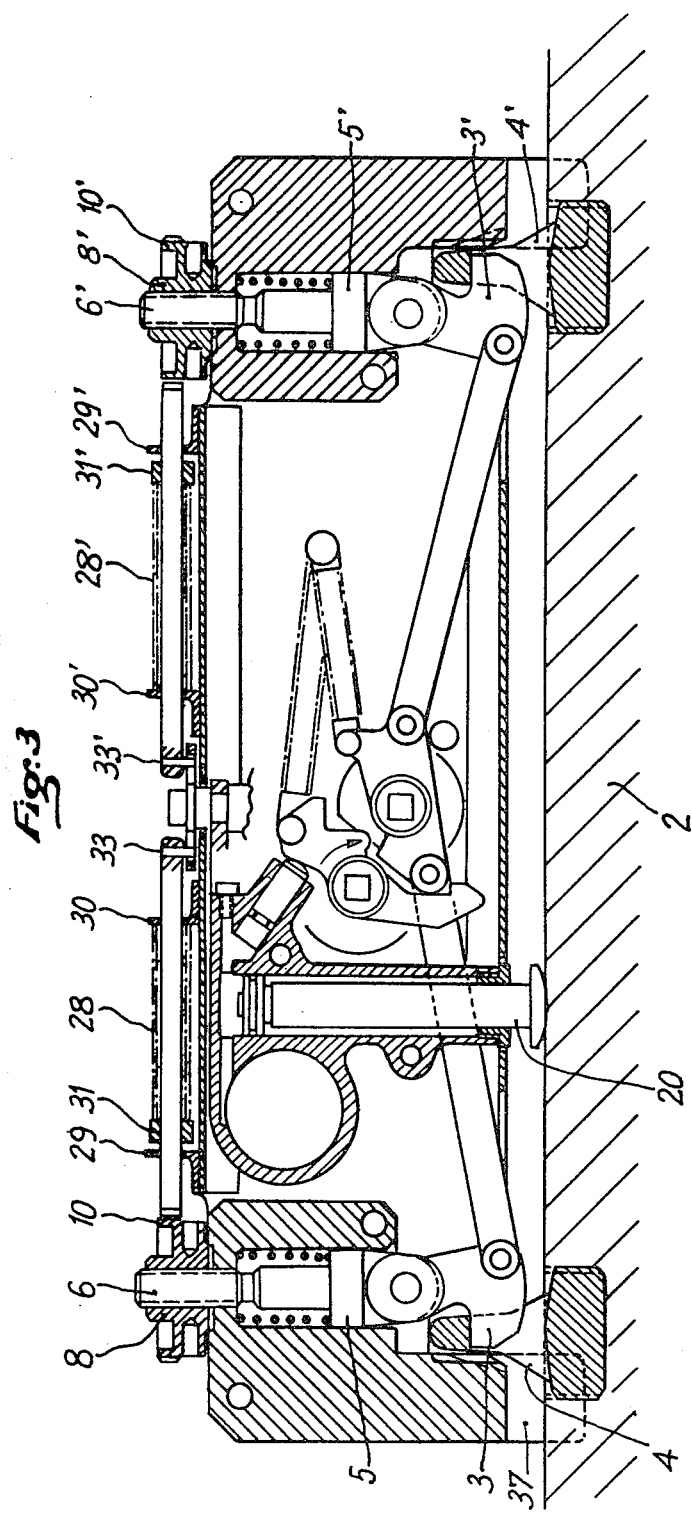

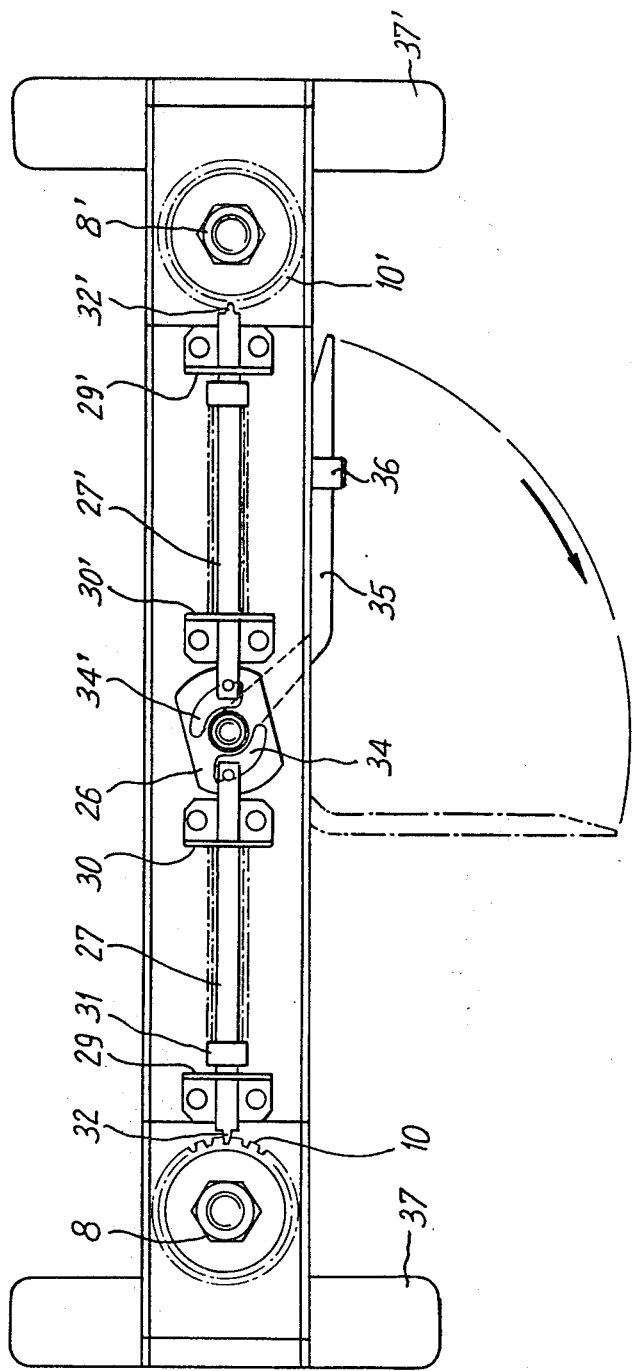

SAFETY LOCK FOR A CARRYING AND JETTISONING DEVICE FOR LOADS TRANSPORTED UNDER AIRCRAFT

BACKGROUND OF THE INVENTION

Several carrying and jettisoning devices for loads under aircraft are already known, as well as methods for wedging these loads against fixed bearings by raising the hooks of the carrying device after the loads has been suspended thereto.

Generally, immediately after the load is hooked, a safety pin is introduced into the carrying device to prevent any untimely releasing thereof. Complementary operations can thus be performed without risk, particularly the actuation of nuts ensuring the raising of the suspension hooks for bringing the load to engage fixed bearing members. Such screw and nut systems are theoretically irreversible but, since in flight they are subject to relatively high vibrations particularly aboard helicopters, they have to be immobilized by braking means after their screwing.

SUMMARY OF THE INVENTION

In order to make easier the successive operations which consist in introducing the safety pin into the carrying device, in braking the nuts after screwing thereof and in removing the safety pin, and to prevent an omission, it is proposed according to the invention to combine these operations in a single device only necessitating one action of the operator on an operating handle.

In a removed position of this handle (corresponding to a flight position of the device), the nuts are locked and the release mechanism is free. Since the nuts are locked, the operator cannot perform the wedging of the load and to this end he must necessarily first move the handle to a raised position that results in locking the release mechanism and releasing the nuts. Inversely, before taking off, the operator has to move back the handle to its remove position thus causing the release mechanism to be freed and the hook raising nuts to be locked.

BRIEF DESCRIPTION OF THE DRAWINGS

FIG. 3 is a view similar to FIG. 1, with the device being in its flight condition i.e. the suspension hooks being in their uppermost position, the load engaging the fixed bearings, the nuts adjusting the upward position of the hooks being locked, and the safety lock being removed;

FIG. 5 is plan view from above of the device showing the mechanism ensuring the release of the nut brakes.

DESCRIPTION OF THE PREFERRED EMBODIMENT

Figure 1:
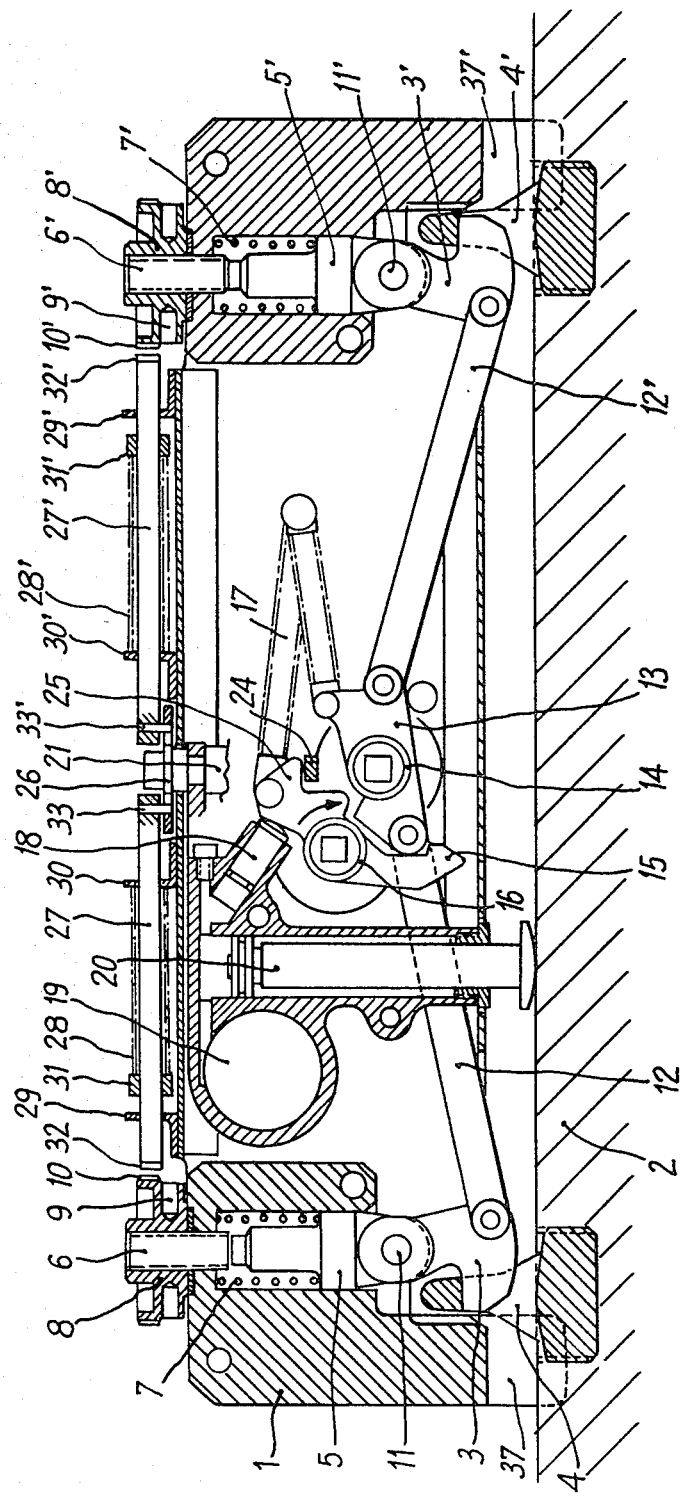
FIG. 1 is a diagrammatic longitudinal section of the device, with the load being hooked, the suspension hooks being in their lowermost position and the nuts adjusting the height of the hooks being released.

In the drawings the reference numeral 1 designates diagrammatically the contour of the hooking device of the aircraft, 2 being the load, 3 and 3' being the supporting hooks engaging the rings 4 and 4' respectively of the load 2, 5 and 5' being straps to which the hooks 3 and 3' are respectively pivoted, these straps comprising tail portions 6 and 6' respectively which are urged downwards by springs 7 and 7' respectively. The tail portions 6 and 6' are moved vertically by nuts 8 and 8' which present radial bores such as 9 and 9' into which can be introduced a working pin and a castellated circular portion 10 and 10'.

The supporting hooks 3 and 3' are pivoted about pins 11 and 11' to the straps 5 and 5' respectively, and they are connected to an effort demultiplication mechanism which is of a well known type and consequently which has not been described in detail. This effort demultiplication mechanism essentially comprises links 12 and 12' which are pivoted to a member 13 adapted to rock on fixed bearings 14. The rotation of the rocking member 13 is prevented by means of a hook member 15 pivoted on fixed bearings 16. A rotation of the hook member 15 in the direction of the arrow of FIGS. 1 and 3 liberates the rocking member 13 and thus allows the opening of the supporting hooks 3 and 3'. The hook member 15 is urged by a compression spring 17 towards its position preventing rotation of the rocking member 13. The rotation of the hook member 15 to liberate the rocking member 13 is obtained through the action of a small piston 18 actuated in turn by a pyrotechnic impeller 19 simultaneously actuating the ejection piston 20.

Figure 2:
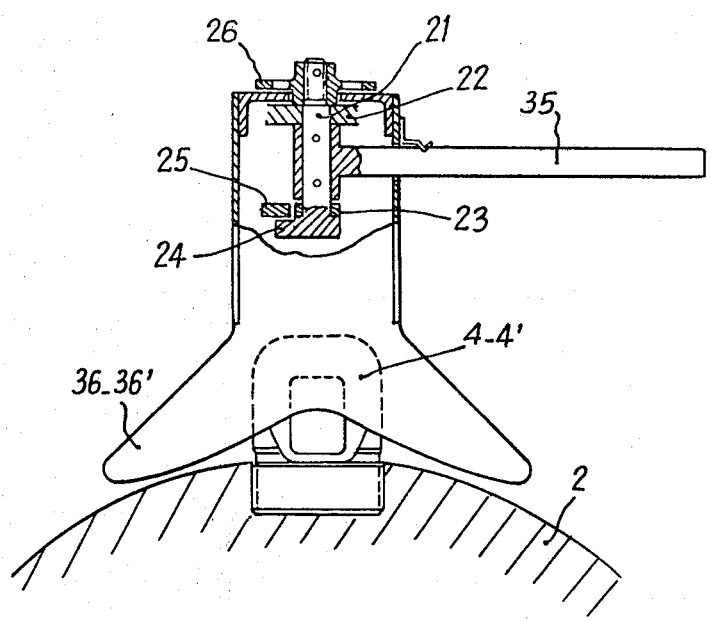
FIG. 2 is a sectional transverse view of the suspension hooks in their lowermost position.

Reference numeral 21 designates (see particularly FIG. 2) a lock adapted to rotate about a vertical axis on bearings 22 and 23. At its lower part lock 21 presents a heel portion 24 adapted to enter under a part 25 of hook member 15, and the upper part of said lock 21 presents a cam shaped plate 26 adapted simultaneously to actuate rods 27 and 27'. The rods 27 and 27' are each urged by a spring 28 and 28' respectively towards the castellated portions 10 and 10' of nuts 8 and 8'. These rods 27 and 27' are guided in bearings 29–30 and 29'–30' respectively and each one carries a strap 31 and 31' acting as a bearing for the associated springs 28–28' while, at its end adjacent the nut 8 and 8' to be braked, each rod 27 and 27' carries a wedge-shaped nose portion 32 and 32' adapted to engage notches of castellated portions 10 and 10'. At its opposite end each rod 27 and 27' carries a finger 33 and 33' engaging a cam member 34 and 34' of plate 26. The reference numeral 35 designates an operating handle 35 for the rotating lock 21 (see FIG. 5) which is urged in a removed position by means of a spring fastener 36 when the device is in position ready for flight.

The mode of operation of the device is as follows, assuming the supporting hooks are in their lowermost position and the load 2 is suspended through its rings 4 and 4' as shown at FIG. 1. By rotating the operating handle 35 from its flight position shown in full lines in FIG. 5 to its removed position shown in chain dotted lines, the lock 21 is caused to rotate in the direction of the arrow of FIG. 5 and to enter its heel portion 24 under portion 25 of the hook member 15 (see FIGS. 1 and 2) thus preventing a releasing of the load hooking mechanism, even in the event of an untimely operation of pyrotechnic impeller 19.

Simultaneously the rotation of plate 26 rigid with lock 21 causes, due to the shape of cam members 34 and 34' (see FIG. 5), the retirement of the nose portions 32 and 32' of rods 27 and 27' from the notches of the castellated portions 10 and 10'. Thus a rotation of nuts 8 and 8' by means of a standard pin (not shown) introduced into the bores 9 and 9' is made possible and allows the raising of load 2 and the wedging thereof against the fixed bearing members 37 and 37' as indicated in FIG. 4.

Figure 4:
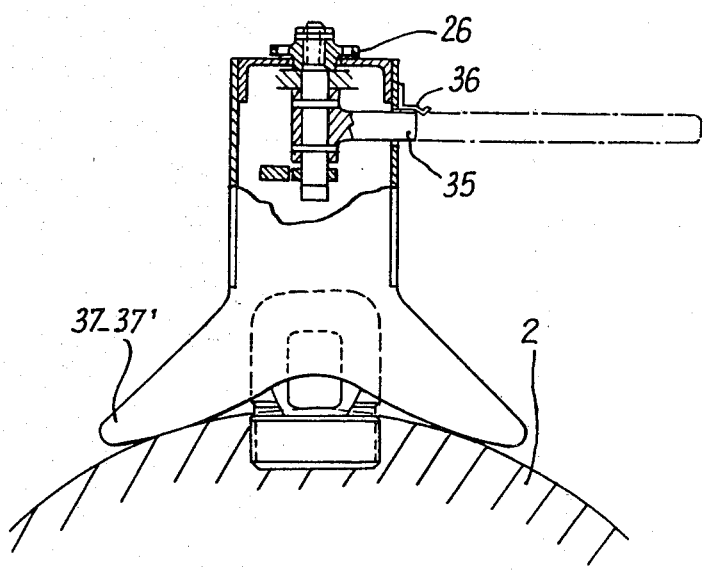
FIG. 4 is a sectional transverse view of the device with the suspension hooks in their uppermost positions.

A reverse operation of handle 35 frees the heel portion 24 and liberates the release mechanism, while the springs 28 and 28' cause the nose portions 32 and 32' of rods 27 and 27' to engage the castellated portions 10 and 10' of nuts 8 and 8', as shown at FIG. 3 which is similar to FIG. 1 but differs therefrom on the one hand by the fact that supporting hooks 3 and 3' have been raised to bring the load in the position of FIG. 4 and, on the other hand, by the freeing of the locking heel 24 liberating the release mechanism and by the simultaneous engagement by the castellated portions 10 and 10' of nuts 8 and 8' by the nose portions 32 and 32' of the rods 27 and 27'.

Although a specific form of embodiment of this invention has been described hereinabove and illustrated in the accompanying drawings, it will readily occur to those skilled in the art that various modifications and changes may be brought thereto without departing from the scope of the invention as set forth in the appended claims.

What we claim is:

1. In a carrying and jettisoning device for loads transported under aircraft, comprising:
    suspension hooks for the load pivoted to movable supports and adapted to take an open position and a closed working position,
    means ensuring a limited vertical movement of said supports,
    fixed bearings adapted to be engaged by the load supported by the suspension hooks when said hooks are in an uppermost position, and
    a system for locking said suspension hooks in their closed position and for controlling the opening of said hooks, which comprises a pivoted locking element adapted to hold said suspension hooks in their closed position;
  a safety lock comprising:
    a pivoted body,
    a control member rigid with said pivoted body and adapted when actuated to pivot said safety lock body between a first position and a second position, and inversely,
    a first extension rigid with said pivoted body and adapted, in said first position of said safety lock body, to cross the path of the pivoted locking element of the suspension hook to prevent movement of said locking element in a direction allowing the locking system for the suspension hooks to be liberated and, in said second position of said safety lock body, to free said path of the pivoted locking element, and
    a second extension rigid with said pivoted body, co-acting with movable members disposed in the vicinity of the means ensuring a limited vertical movement of the suspension hooks so that in said first position of the pivoted body said movable members are removed from said means ensuring a limited vertical movement of the suspension hooks while, in said second position of the pivoted body, said movable members engage said means ensuring a limited vertical movement of the suspension hooks in order to prevent the actuation thereof and thus the vertical movement of the suspension hooks.

2. A safety lock for a carrying and jettisoning device for loads transported under aircraft according to claim 1, wherein said second extension rigid with the pivoted body of the safety lock consists of a plate acting through cam portions on rods having end portions which, in said second position of the pivoted body, engage openings of rotating nuts adapted to ensure the vertical movement of the suspension hooks.

3. A safety lock for a carrying and jettisoning device for loads transported under aircraft according to claim 2, wherein springs urge said rods in the direction to engage the openings of said rotating nuts.

* * * * *